Dec. 19, 1967 W. LEHNERT 3,359,547

MAGNETIC TAPE RECORDER

Filed Dec. 3, 1963 2 Sheets-Sheet 1

Dec. 19, 1967 W. LEHNERT 3,359,547

MAGNETIC TAPE RECORDER

Filed Dec. 3, 1963 2 Sheets-Sheet 2

United States Patent Office 3,359,547
Patented Dec. 19, 1967

3,359,547
MAGNETIC TAPE RECORDER
Walter Lehnert, Munich, Germany, assignor to Siemens Aktiengesellschaft, a corporation of Germany
Filed Dec. 3, 1963, Ser. No. 327,634
Claims priority, application Germany, Dec. 5, 1962, S 82,749
5 Claims. (Cl. 340—174.1)

ABSTRACT OF THE DISCLOSURE

A magnetic recorder for data processing machines, having a relatively fixed tape reel and an exchangeable tape reel, tape transport members, a magnetic head system, and buffer cassettes for the tape arranged to receive tape operatively extending between said reels and the magnetic head system, with such buffer cassettes being constructed in the form of vertically extending, downwardly directed vacuum chambers laterally spaced and having openings in their upper portions for the passage of tape therethrough, the tape transport members and magnetic head system being centrally disposed at a height in the vicinity of the cassette openings with the air gap of the magnetic head system facing upwardly, the reels being arranged one above the other and disposed below said magnetic head system between the buffer cassettes, the reels having their axes laterally mutually displaced to dispose each reel relatively closely adjacent to a respective buffer cassette, the tape adapted to extend from each reel to the respective adjacent buffer cassette and form a downwardly directed loop therein.

*The disclosure*

Figure 1:
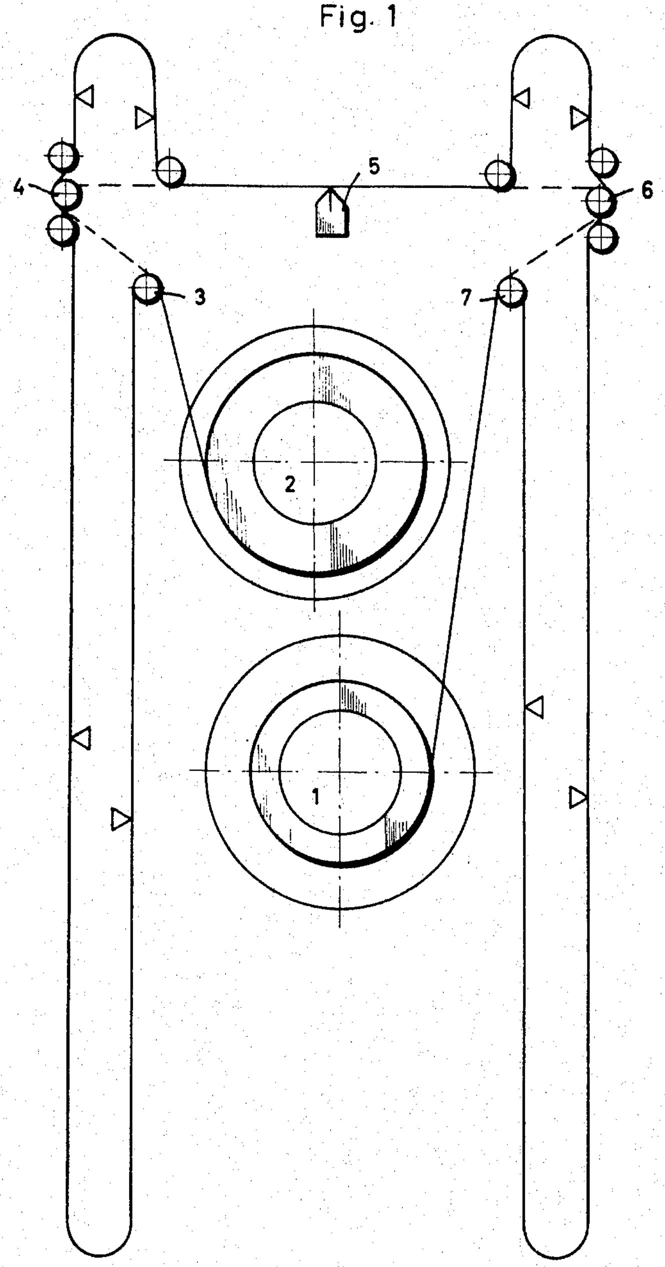

The invention disclosed herein is concerned with a high speed magnetic tape recorder for data processing machines, having all parts disposed in harmonious and space saving manner which facilitates operation and accessibility to individual elements.

In connection with magnetic tape recorders for data processing machines, in which the data generally have to be read out in start-stop operation, there is posed the requirement that so-called buffer cassettes be provided between the supply and the receiving reels for the magnetic tape. This is necessary because the recording and readout or pickup operations require relatively high tape speeds with which the supply and receiving reels cannot keep step owing to the masses involved. Considering the tape speed applied and the large reel diameters employed at the present time, the length of tape to be accommodated in a buffer cassette must amount to at least 2.5 meters if disturbing program limitations are to be avoided.

Various magnetic tape recorders have become known which reliably satisfy the requirement for a minimum tape length of 2.5 meters.

The present invention is concerned with a magnetic tape device or recorder which is structurally developed so that the parts required for the operation thereof, including the buffer cassettes, can be disposed with a minimum expenditure so far as the space is concerned. The tape guide is to be effected so that the side of the tape which is provided with magnetic material is in consideration of the life of the tape carried over relatively few deflection rollers.

The indicated conditions are advantageously met by the provision of a magnetic tape device comprising means for disposing the supply- and receiving reels one above the other, preferably laterally mutually slightly staggered, means for arranging the buffer cassettes, preferably in the form of so-called vacuum chambers, laterally of the tape reels at an effective level extending up to the region of the upper reel, and means for disposing the tape transport and the magnetic head means, preferably centrally, above the reels.

It is according to another feature of the invention particularly advantageous to provide between the tape transport and each of the respective laterally arranged buffer chambers an extension or head chamber for reliably equalizing the initial transport operations occurring upon accelerating and stopping of the tape.

The arrangement of the supply- and receiving reels of a tape device, vertically one above the other, is as such known. However, in previously known embodiments, the tape transport and the magnetic head are not disposed either between the reels or in connection with a buffer cassette. As a consequence, the effective tape loop length within a buffer cassette, must be held very much shorter if the structural height of the device is not to be disproportionally increased. Other embodiments carry the tape loop upwardly, thus requiring additional expenditure for control means.

The various objects and features of the invention will appear from the appended claims and from the description of an embodiment which is rendered below with reference to the accompanying drawings.

Figure 2:
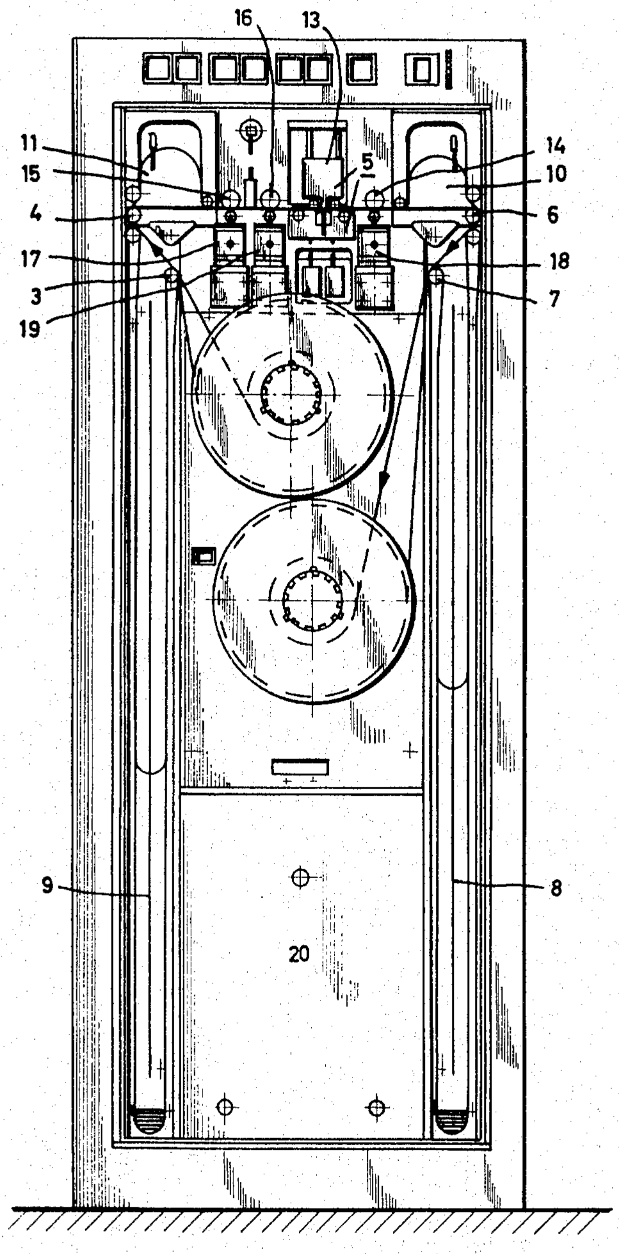

FIG. 1 is a schematic view of the new tape device illustrating the spatial distribution of the supply- and receiving reels, the disposal of the tape in the buffer cassettes and the magnetic head aggregate; and FIG. 2 shows some structural details of the tape device according to FIG. 1.

Referring now to the drawings, numeral 1 indicates the fixed reel (supply reel) and numeral 2 the exchange reel or tape receiving reel, that is, the reel which receives the tape and which can be removed therewith. The manner in which the tape is guided between the two reels is clearly apparent from FIG. 1. The path of the tape upon rapid advance thereof, for example, upon rewinding from the fixed reel (supply reel) to the receiving (exchangeable) reel, is indicated in FIG. 1 by dash lines. Upon rewinding, the tape need not enter into the extension or head chambers since neither start-stop nor reversing operations are required therefor.

The total height of the device shall be, for example, 1700 millimeters so that the magnetic tape moving within the buffer cassettes can have a length of about 3 meters, assuming the length of the buffer cassettes to amount to about 1500 millimeters.

In the illustrated embodiment, and assuming the total height of the device to amount to about 1700 millimeters, the fixed reel 1 is disposed below the exchangeable reel 2, the latter thus being at least approximately at shoulder level. Moreover, such arrangement facilitates the threading of the tape within the device, since the tape can be carried from the exchangeable reel 2 directly over the deflection roller 3, the tape insertion roller 4, over the magnetic system 5, the tape insertion roller 6 and the deflection roller 7. The axes of the two reels are mutually laterally staggered or displaced so that brushing against the reel 2, of the tape carried to the lower reel 1 is reliably avoided even when the reel 1 is empty.

There are provided two buffer cassettes 8 and 9 which extend, as already indicated, laterally or along the sides of the machine practically over the entire height thereof, tape lengths being guided within such cassettes with the side carrying the magnetic layer facing inwardly. The construction of the buffer cassettes, in the form of so-called vacuum chambers, together with the control means for driving the reels 1 and 2 in one or the other direction, may be effected in known manner.

In order to avoid too rapid acceleration of the tape loops disposed within the buffer chambers, upon starting and stopping of the tape, due to the masses involved, there are provided extension or equalizing chambers 10 and 11 in each of which is always disposed a tape loop of average length. The use of equalizing or head chambers, is as such known. In the tape device according to the invention, there is no control operation released depending upon the tape loop in the corresponding equalizing chambers, the respective tape loops merely serving the purpose of enabling rapid starting and stopping of the tape within the range of the magnetic head aggregate 5.

The magnetic head aggregate 5 which is only schematically indicated may comprise, for example, a plurality of dual magnetic heads 12 and a mechanism 13 for exerting pressure on the tape. There are in addition provided transport rollers 14 and 15, one on each side of the magnetic head aggregate, as well as a brake member 16 together with corresponding transport magnets 17 and 17, respectively, and a brake magnet for releasing the operation of the various transport rollers and the brake member. Fixed tape guides in the form of a plurality of bolts are aranged within the region of the magnetic head aggregate.

This arrangement of the magnetic head aggregate provides the advantage that nearly the entire width of the machine can be utilized for disposing the components for the tape transport as well as for the pickup and recording devices, the corresponding transport means enabling straight guidance of the tape and thus facilitating the insertion of new tapes. Since the side of the tape provided with the magnetic layer faces inwardly, such layer is subjected to mechanical stress only along the two deflection rollers 4 and 6 and within the region of the drive means and the pickup and recording means. All other guide and deflection systems are in engagement with the back side of the tape.

As will be seen from the drawings, the teaching of the invention makes it possible to dispose in a frame or housing, in harmonious and space-saving manner all parts which are required for a high speed magnetic tape device or machine. It is understood, of course, that modifications are possible within the scope of the invention; for example, the positions of the respective reels may be exchanged without departing from the contemplated basic concepts. If desired, one or the other of the reels may in a special case be disposed at a very much lower level; however, such disposal would somewhat diminish the advantages gained by guiding the tape over relatively short paths and would also effect the construction of the lower housing or frame portion as an air filter chamber indicated by numeral 20.

The magnetic head aggregate and also the controls for the operation of the reels and the drive and brake members as well as air pressure control and other details can be constructed along well known lines.

Changes may be made within the scope and spirit of the appended claims which define what is believed to be new and desired to have protected by Letters Patent.

I claim:

1. A magnetic tape recorder for data processing machines, comprising a relatively fixed tape reel and an exchangeable tape reel, tape transport members, a magnetic head system, and buffer cassettes for the tape arranged to receive tape operatively extending between said reels and the magnetic head system, said buffer cassettes being constructed in the form of vertically extending, downwardly directed vacuum chambers which are laterally spaced and have openings in their upper portions for the passage of tape therethrough, said tape transport members and said magnetic head system being centrally disposed at a height in the vicinity of said cassette openings, with the air gap of said magnetic head system facing upwardly, said reels being arranged one above the other and disposed below said magnetic head system between said buffer cassettes, said reels having their axes laterally mutually displaced to dispose each reel relatively closely adjacent to a respective buffer cassette with the tape adapted to extend from each reel to the respective adjacent buffer cassette and form a downwardly directed loop therein.

2. A magnetic tape recorder according to claim 1, wherein said exchangeable reel is disposed above said relatively fixed reel.

3. A magnetic tape recorder according to claim 2, comprising means operatively disposed on the tape path between the magnetic head system and the top of each buffer chamber forming an equalizing buffer chamber for receipt of an upwardly directed tape loop.

4. A magnetic tape recorder according to claim 3, wherein said tape transport means includes tape drive and tape brake elements which are disposed in line with the magnetic head system to enable straight line motion of the tape with respect to said elements and system.

5. A magnetic tape recorder according to claim 4, comprising means for guiding the tape for clockwise motion from the exchangeable reel to the relatively fixed reel with the magnetically effective side thereof facing inwardly.

References Cited

UNITED STATES PATENTS

| | | | |
|---|---|---|---|
| 3,106,357 | 10/1963 | Kobayashi | 242—55.12 |
| 3,170,045 | 2/1965 | Baumeister | 340—174.1 |
| 3,294,331 | 12/1966 | Wang | 226—118 |
| 3,062,464 | 11/1962 | Moose et al. | 340—174.1 |

BERNARD KONICK, *Primary Examiner.*

R. R. SNIDER, *Assistant Examiner.*